United States Patent
Lehner et al.

(10) Patent No.: US 8,019,568 B2
(45) Date of Patent: Sep. 13, 2011

(54) PHYSICS-BASED OIL TEMPERATURE MODEL

(75) Inventors: Chad W. Lehner, Howell, MI (US); Balaji Maniam, Petaluma, CA (US); Gary D. Mandrusiak, Latham, NY (US); David A. Smyczynski, Pinckney, MI (US); Craig Lash, Novi, MI (US)

(73) Assignee: GM Global Technology Operations LLC

( * ) Notice: Subject to any disclaimer, the term of this patent is extended or adjusted under 35 U.S.C. 154(b) by 249 days.

(21) Appl. No.: 12/259,718

(22) Filed: Oct. 28, 2008

(65) Prior Publication Data
US 2009/0119056 A1    May 7, 2009

Related U.S. Application Data

(60) Provisional application No. 60/985,527, filed on Nov. 5, 2007.

(51) Int. Cl.
*G01K 17/00* (2006.01)

(52) U.S. Cl. .................................................... 702/136
(58) Field of Classification Search .................. 702/136; 701/113; 508/208
See application file for complete search history.

(56) References Cited

U.S. PATENT DOCUMENTS

| | | | |
|---|---|---|---|
| 2002/0161508 A1* | 10/2002 | Pfeiffer et al. | 701/113 |
| 2006/0105923 A1* | 5/2006 | Murray | 508/208 |

* cited by examiner

*Primary Examiner* — Drew A Dunn
*Assistant Examiner* — Xiuquin Sun

(57) ABSTRACT

A system includes an input and a thermal data processing module. The input receives a first oil temperature of an engine oil when an engine is turned on. The thermal data processing module estimates a first heat transfer from a piston of the engine to the engine oil. The thermal data processing module estimates a second heat transfer from the engine oil to an engine block of the engine. The thermal data processing module determines a second oil temperature of the engine oil based on the first oil temperature and the first and second heat transfers.

18 Claims, 12 Drawing Sheets

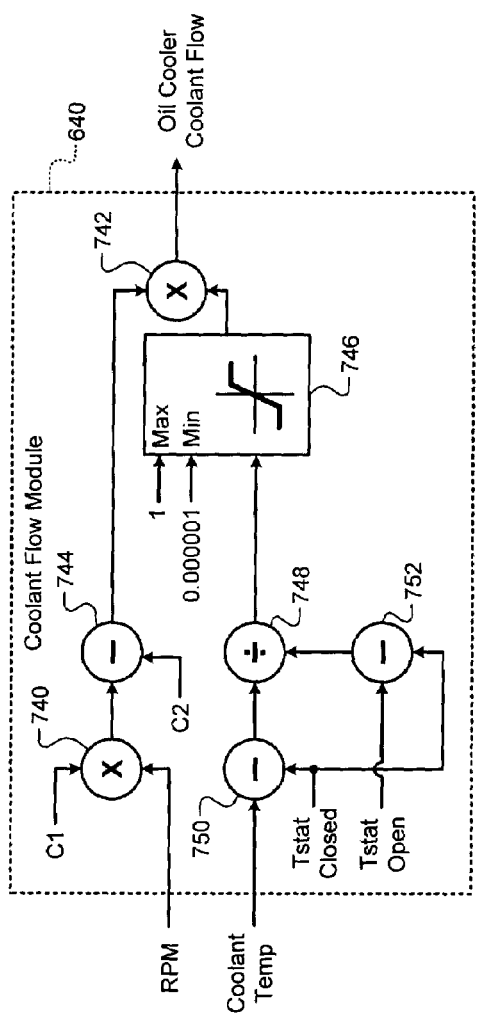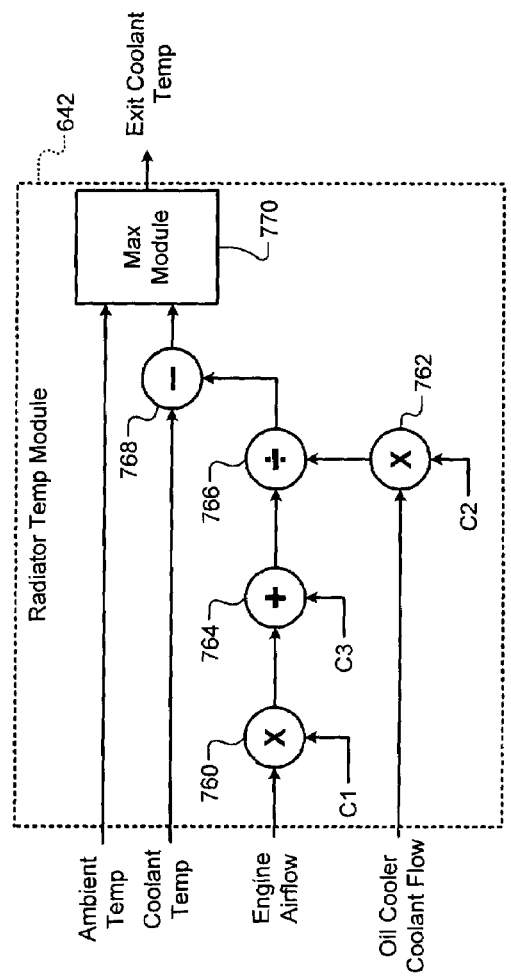

PHYSICS-BASED OIL TEMPERATURE MODEL

CROSS-REFERENCE TO RELATED APPLICATIONS

This application claims the benefit of U.S. Provisional Application No. 60/985,527, filed on Nov. 5, 2007. The disclosure of the above application is incorporated herein by reference.

FIELD

The present disclosure relates to internal combustion engines, and more particularly to estimating oil temperature in an internal combustion engine using a physics-based model.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a cross-sectional view of an exemplary cylinder of an internal combustion engine is presented. A crankshaft 10 rotates about a main bearing 12. The crankshaft 10 connects to a connecting rod 14, which translates the rotational movement of the crankshaft 10 into linear movement of a piston 16. The piston 16 includes a skirt 18, one or more rings 20, and a crown 22. The piston 16 rides inside of an engine block 30.

The engine block 30 includes fluid passageways 32 for engine coolant (hereinafter coolant). The coolant circulates in the passageway 32 and absorbs heat. The coolant is then circulated through a radiator 40. The coolant releases heat to air flowing across the radiator 40. The crankshaft 10 may be bathed in an oil bath (or oil) 50 contained within an oil pan 52. The oil 50 may be circulated through an oil cooler 54. The oil cooler 54 may include its own radiator to release heat to the atmosphere. Alternatively, the oil cooler 54 may exchange the heat with the coolant. During product development, a temperature of the oil 50 may be measured by a temperature sensor (not shown), which may or may not be available.

SUMMARY

A system comprises an input and a thermal data processing module. The input receives a first oil temperature of an engine oil when an engine is turned on. The thermal data processing module estimates a first heat transfer from a piston of the engine to the engine oil. The thermal data processing module estimates a second heat transfer from the engine oil to an engine block of the engine. The thermal data processing module determines a second oil temperature of the engine oil based on the first oil temperature and the first and second heat transfers.

The thermal data processing module estimates the first and second heat transfers based on geometry of the engine. The thermal data processing module estimates the first and second heat transfers using conductance values generated based on thermal conductivities and heat transfer areas of the engine.

The thermal data processing module estimates a rate of circulation of the engine oil in an oil pan of the engine based on at least one of a viscosity of the engine oil and a difference between temperatures of the engine oil in upper and lower sections of the oil pan. The thermal data processing module estimates the first and second heat transfers based on the rate.

A method comprises receiving a first oil temperature of an engine oil when an engine is turned on, estimating a first heat transfer from a piston of the engine to the engine oil, and estimating a second heat transfer from the engine oil to an engine block of the engine. The method further comprises determining a second oil temperature of the engine oil based on the first oil temperature and the first and second heat transfers.

The method further comprises estimating the first and second heat transfers based on geometry of the engine. The method further comprises generating conductance values based on thermal conductivity and heat transfer area of the engine and estimating the first and second heat transfers using the conductance values.

The method further comprises determining a rate of circulation of said engine oil in an oil pan of said engine based on at least one of a viscosity of said engine oil and a difference between temperatures of said engine oil in upper and lower sections of said oil pan. The method further comprises estimating said first and second heat transfers based on said rate.

A system comprises an oil temperature module and a thermal data processing module. The oil temperature module determines a first oil temperature of an engine oil when an engine is turned on based on a coolant temperature of a coolant of the engine. The thermal data processing module estimates a first heat transfer from a piston of the engine to the engine oil. The thermal data processing module estimates a second heat transfer from the engine oil to an engine block of the engine. The thermal data processing module determines a second oil temperature of the engine oil based on the first oil temperature and the first and second heat transfers.

The oil temperature module determines the first oil temperature based on a heat transfer coefficient generated based on the coolant temperature. The oil temperature module determines the first oil temperature based on a heat transfer coefficient generated based on airflow around an oil pan of the engine. The oil temperature module determines the first oil temperature based on convection areas of the engine block and an oil pan of the engine. The oil temperature module determines the first oil temperature based on a mass and a specific heat of the engine.

The oil temperature module determines the first oil temperature based on an exponential decay to an ambient temperature of at least one of the coolant temperature and temperatures of the engine block and the engine oil. The exponential decay occurs from a first time when the engine is turned off to a second time when the engine is turned on.

The system further comprises an oil cooler module that estimates heat absorbed from the engine oil by an oil coolant of an oil cooler. The thermal data processing module determines the second oil temperature based on the heat absorbed from the engine oil by the oil coolant.

The system further comprises a torque estimation module that estimates an engine torque of the engine based on the second oil temperature.

A method comprises determining a first oil temperature of an engine oil when an engine is turned on based on a coolant temperature of a coolant of the engine. The method further comprises estimating a first heat transfer from a piston of the engine to the engine oil and estimating a second heat transfer from the engine oil to an engine block of the engine. The method further comprises determining a second oil temperature of the engine oil based on the first oil temperature and the first and second heat transfers.

The method further comprises generating a heat transfer coefficient based on the coolant temperature and determining the first oil temperature based on the heat transfer coefficient. The method further comprising generating a heat transfer coefficient based on airflow around an oil pan of the engine and determining the first oil temperature based on the heat transfer coefficient. The method further comprising determining the first oil temperature based on convection areas of the engine block and an oil pan of the engine. The method further comprising determining the first oil temperature based on a mass and a specific heat of the engine.

The method further comprises determining the first oil temperature based on an exponential decay to an ambient temperature of at least one of the coolant temperature and temperatures of the engine block and the engine oil. The method further comprising determining the exponential decay from a first time when the engine is turned off to a second time when the engine is turned on.

The method further comprises estimating heat absorbed from the engine oil by an oil coolant of an oil cooler and determining the second oil temperature based on the heat absorbed from the engine oil by the oil coolant.

The method further comprises estimating an engine torque of the engine based on the second oil temperature.

BRIEF DESCRIPTION OF THE DRAWINGS

The present disclosure will become more fully understood from the detailed description and the accompanying drawings, wherein:

FIG. 17, a functional block diagram of an exemplary coolant flow module used in the radiator module of FIG. 12; and FIG. 18, a functional block diagram of an exemplary radiator temperature module used in the radiator module of FIG. 12.

DETAILED DESCRIPTION

Figure 1:
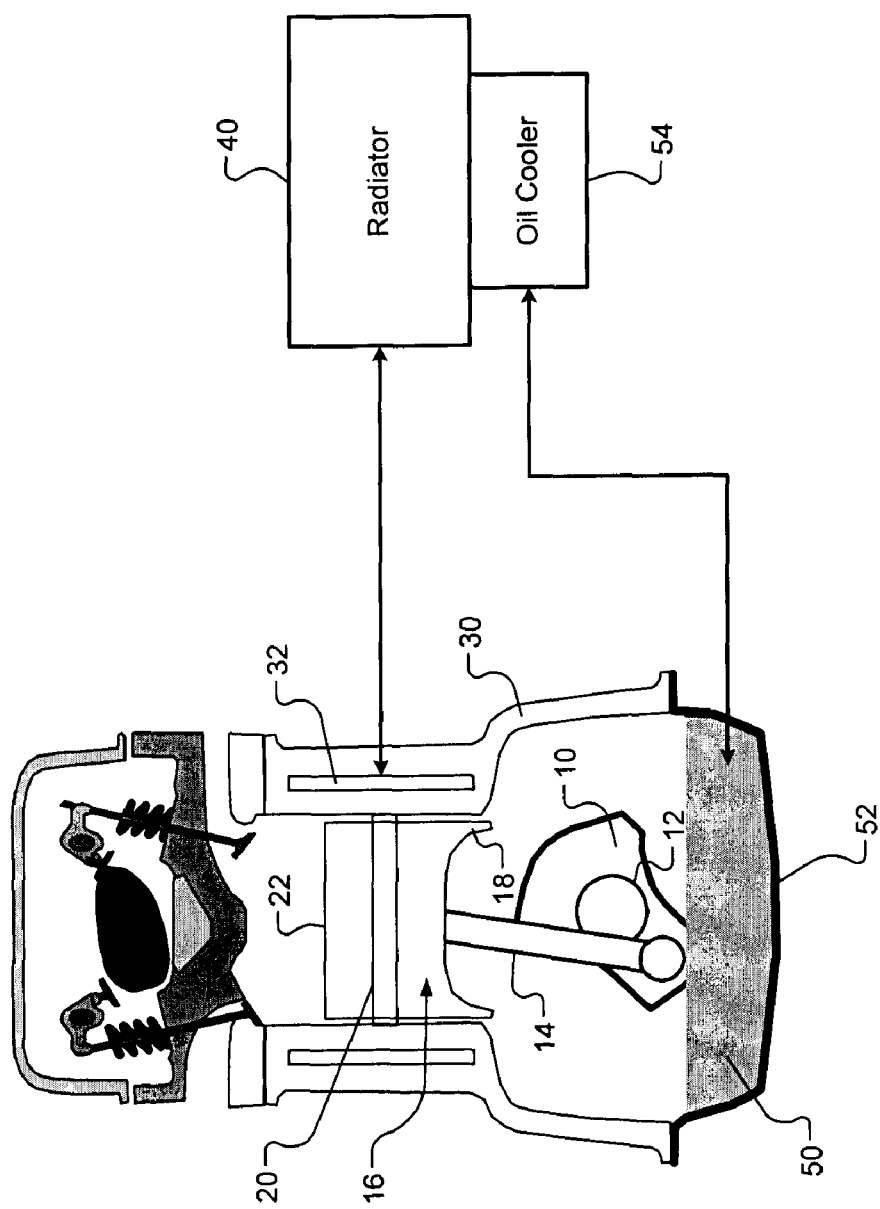
FIG. 1 depicts a cross-sectional view of an exemplary cylinder of an internal combustion engine.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Modeling the oil temperature may eliminate the cost of using oil temperature sensors. Additionally, modeling the oil temperature as disclosed herein may improve the accuracy of the oil temperature model. Traditional oil temperature models may require extensive calibration, may be inaccurate in certain operating regions, and would require redevelopment to adapt to changes in engine parameters (such as cylinder size or oil pan area). For example, a regression model may be created empirically during calibration. Changing an engine dimension or adding an oil cooler would require a recalibration of the regression model.

By contrast, a physics-based oil temperature model as disclosed herein can use engine design parameters and physical constants to estimate oil temperature. The physics-based model can be applied to a modified engine by changing the appropriate parameters in the physics-based model without a complete recalibration. This may significantly reduce calibration effort. In addition, engine parameters may be ascertained at design time, which may allow the physics-based model to be ready or nearly ready before calibration begins. Additionally, the physics-based model may improve the accuracy of the oil temperature model.

Figure 2:
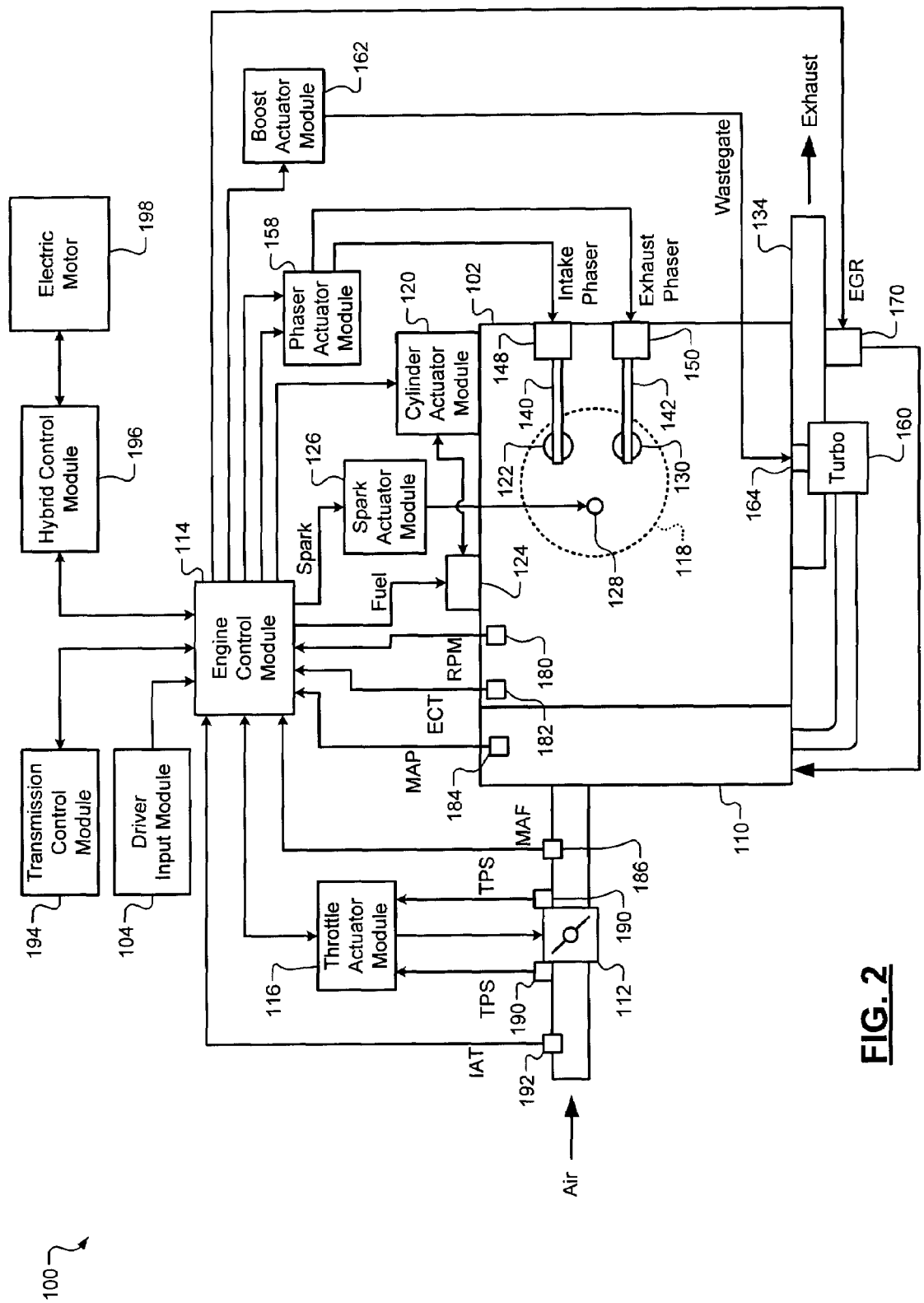
FIG. 2 is a functional block diagram of an exemplary internal combustion engine.
Figure 4:
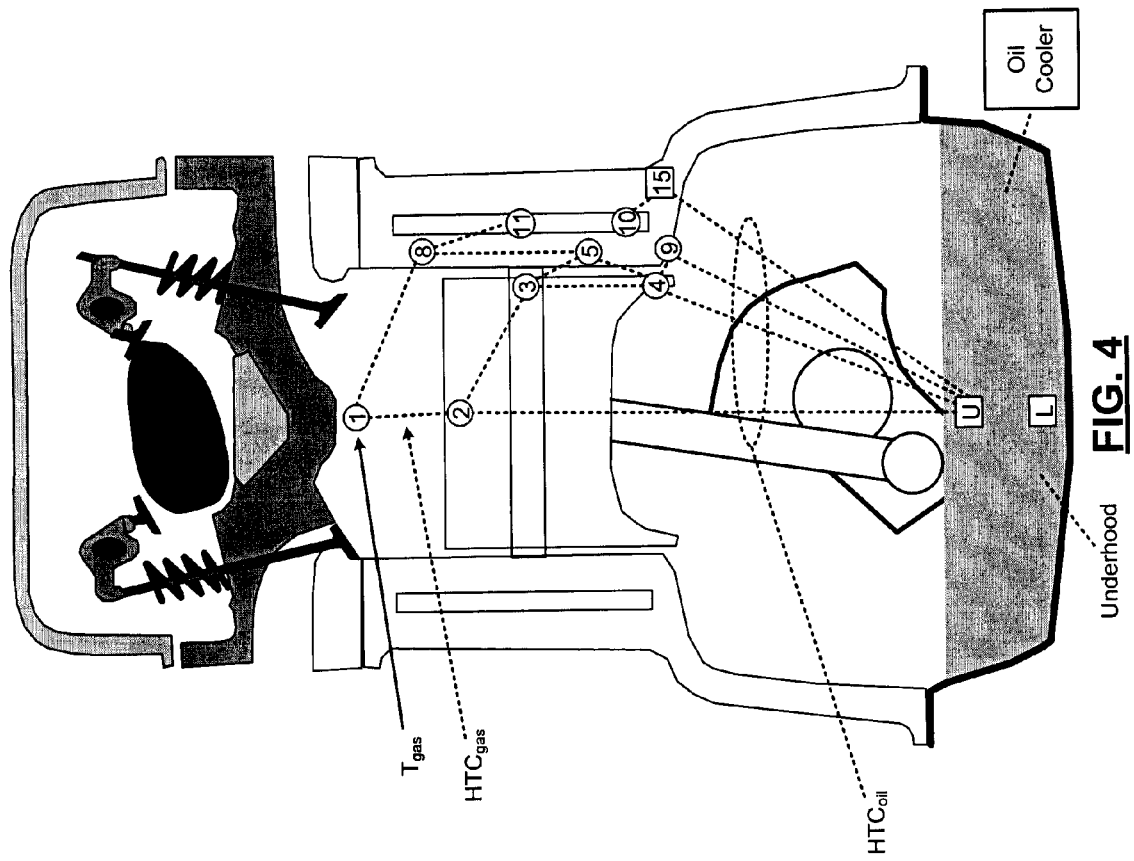
FIG. 4 depicts exemplary temperature estimation points used in modeling heat energy of an engine according to the present disclosure.
Figure 3:
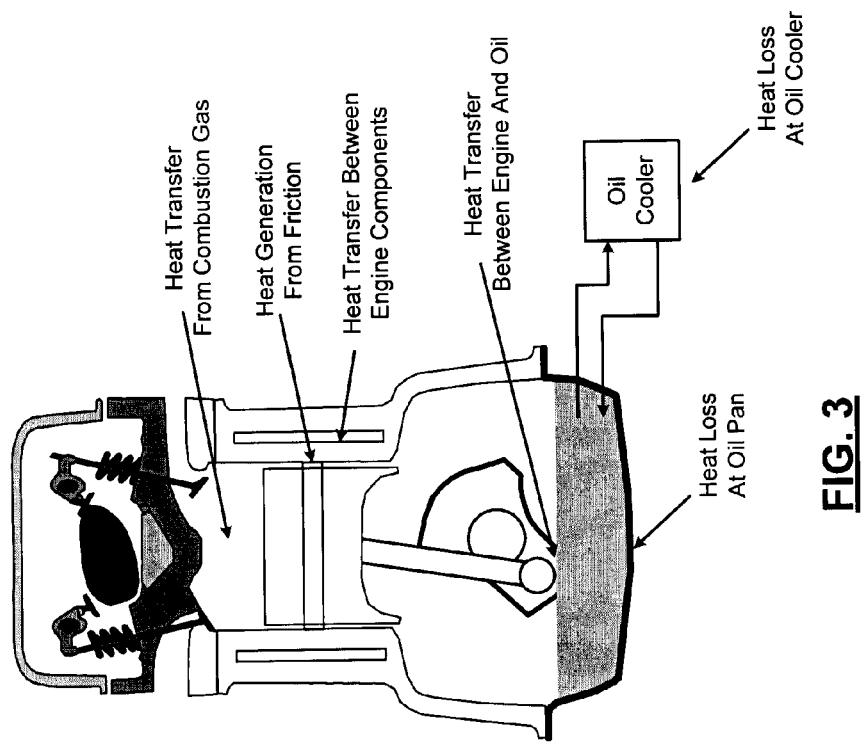
FIG. 3 depicts sources of heat and heat transfer areas in the exemplary cylinder.
Figure 5:
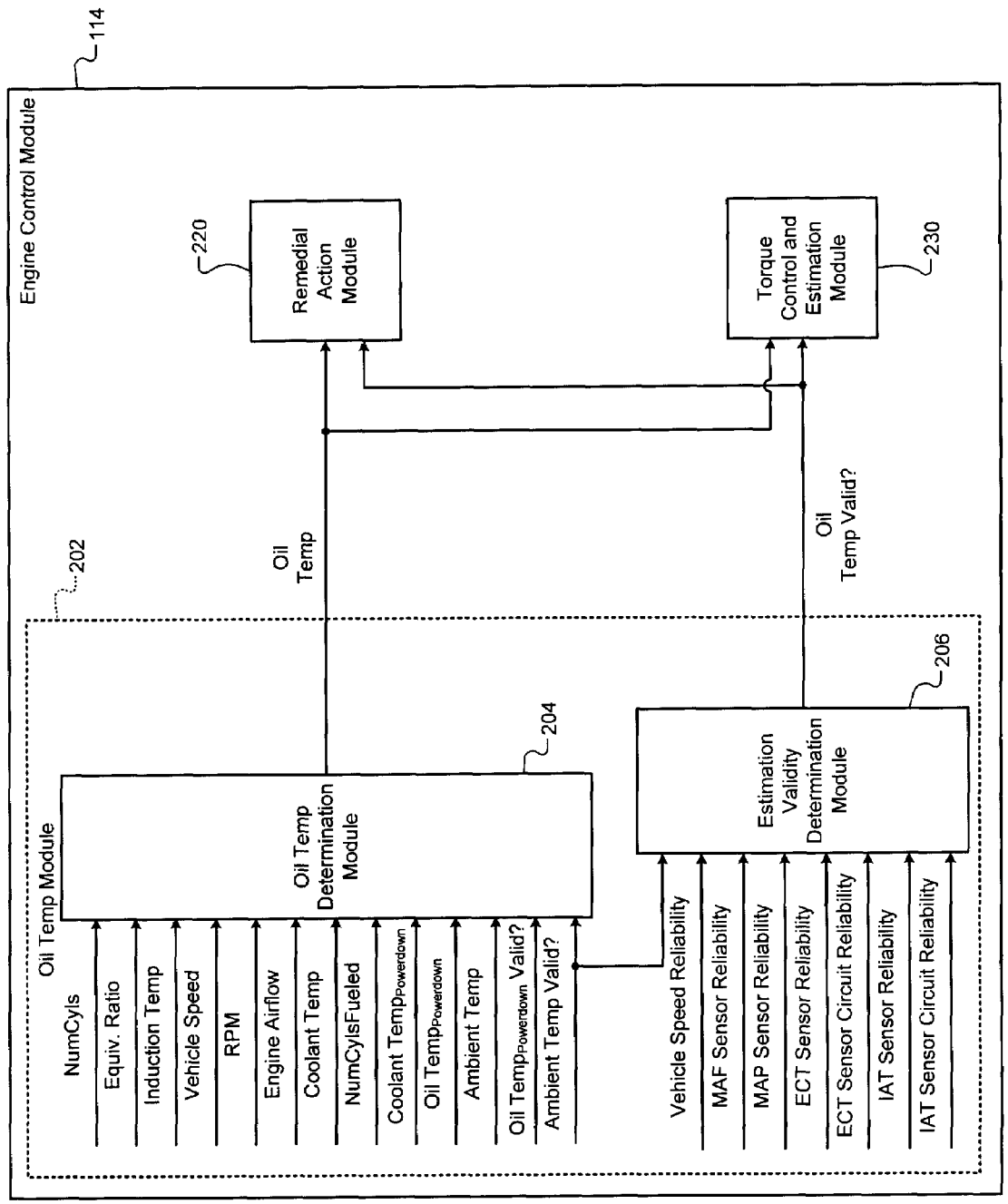
FIG. 5 is a functional block diagram of an exemplary engine control module that implements a physics-based model according to the present disclosure.
Figure 6:
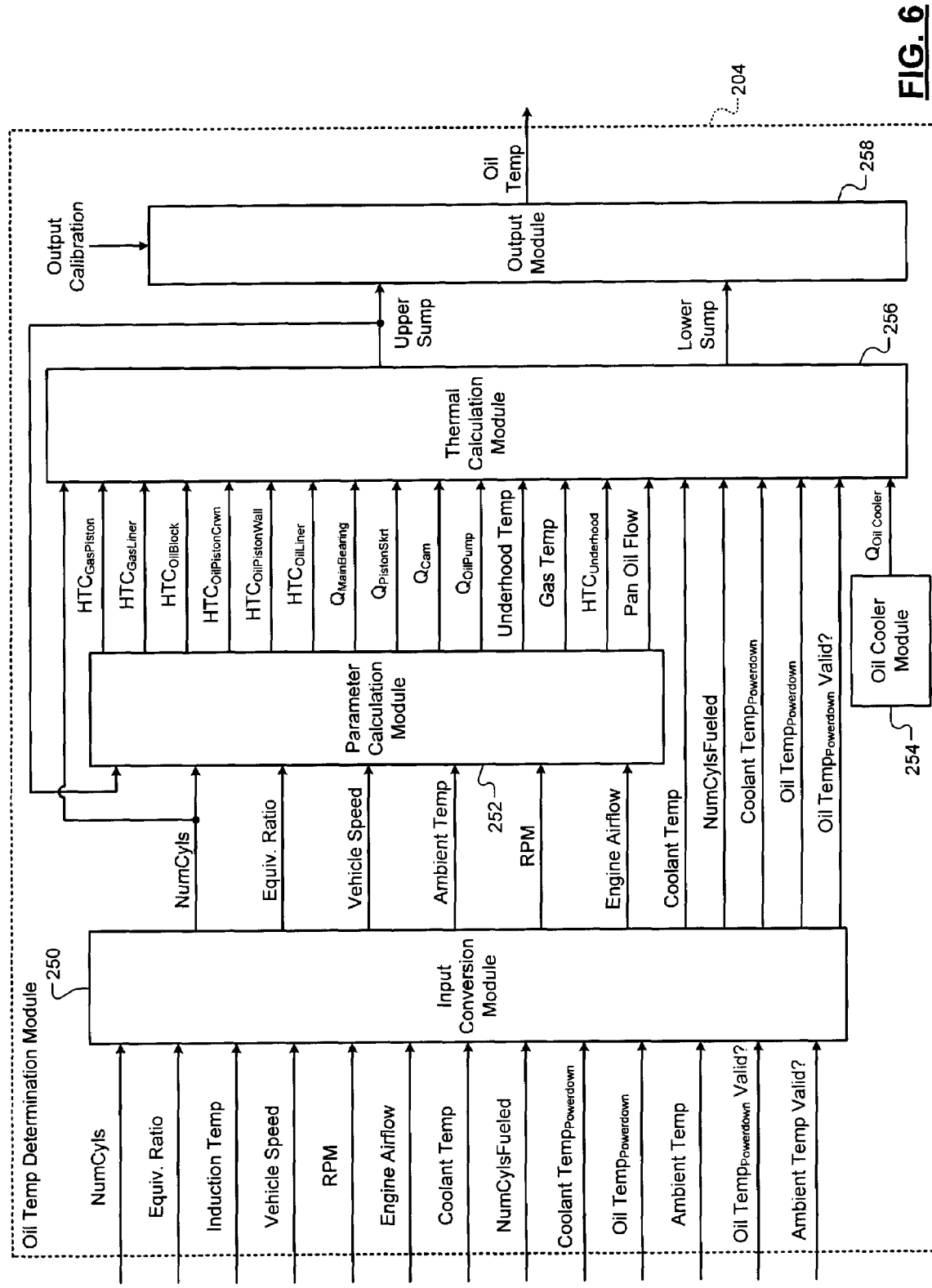
FIG. 6 is a functional block diagram of an oil temperature determination module used in the engine control module of FIG. 5.
Figure 7:
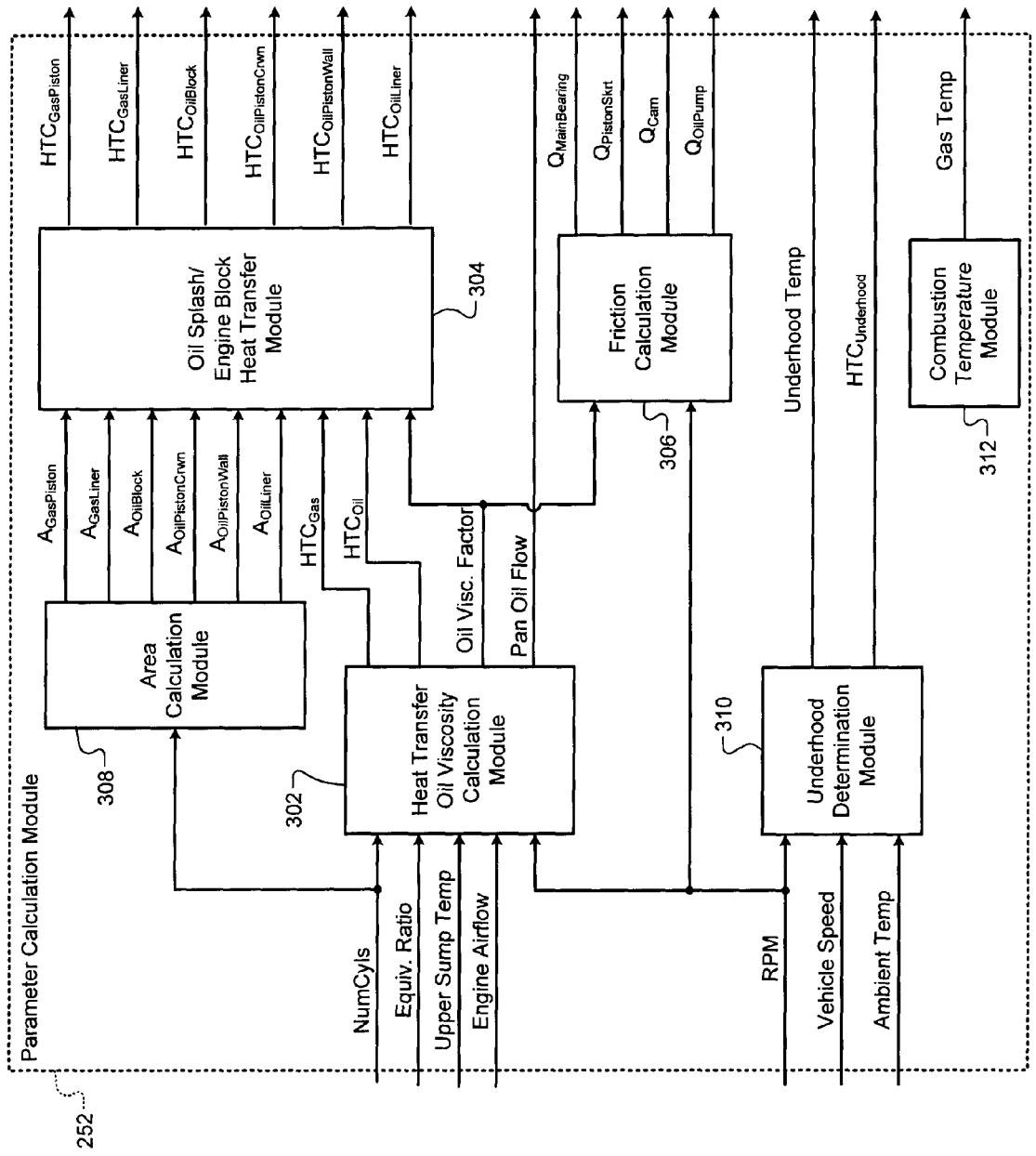
FIG. 7 is a functional block diagram of a parameter calculation module used in the oil temperature determination module of FIG. 6.
Figure 8:
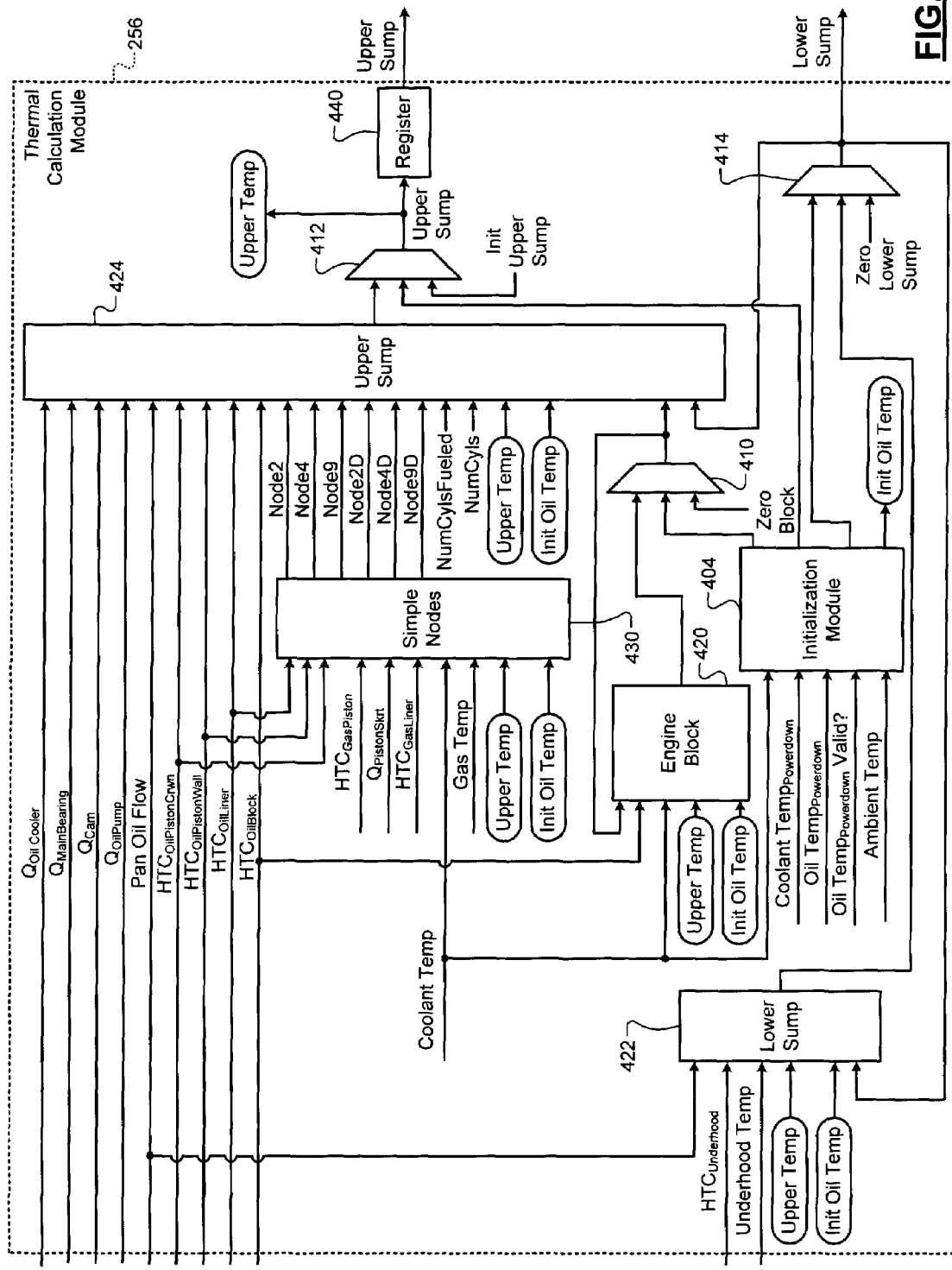
FIG. 8 is a functional block diagram of a thermal calculation module used in the oil temperature determination module of FIG. 6.
Figure 9:
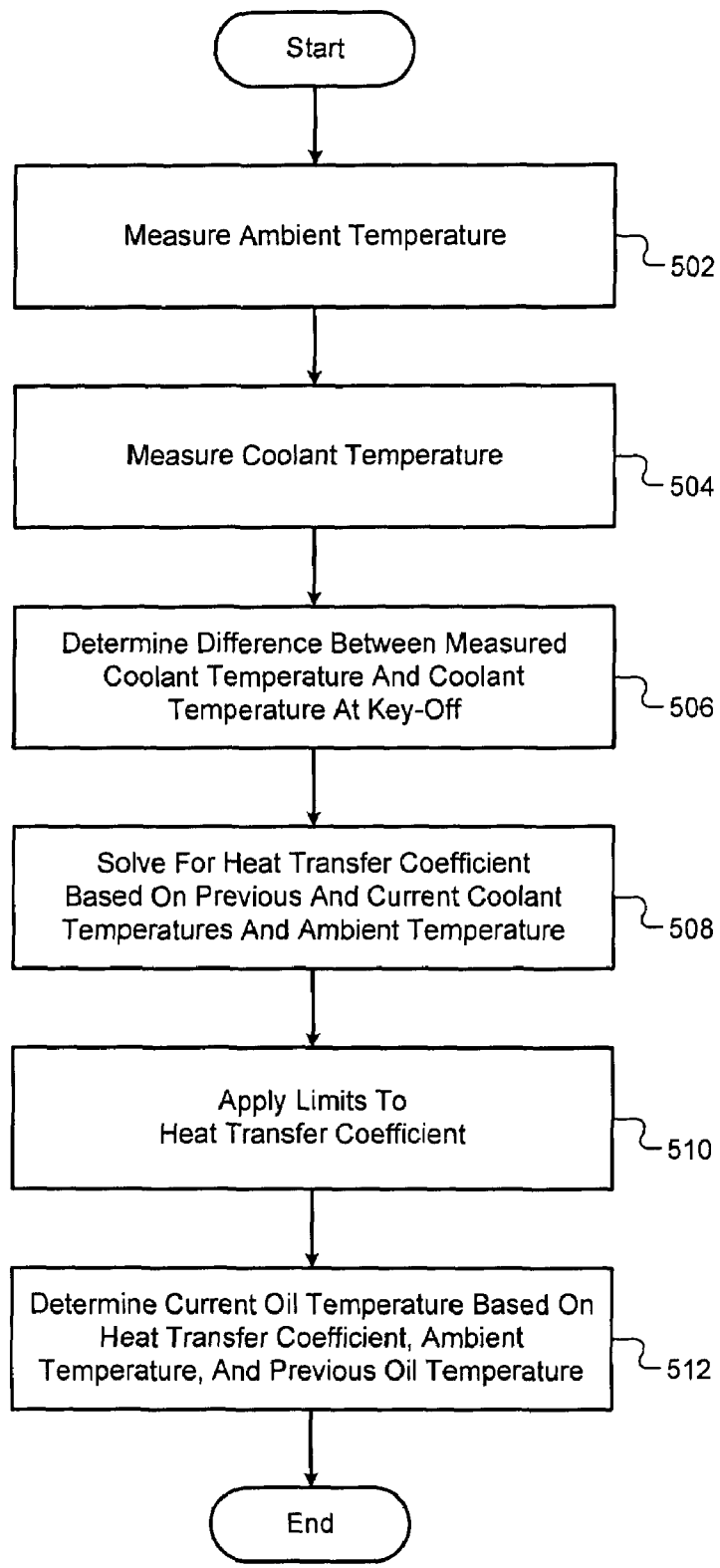
FIG. 9 is a flowchart of an exemplary method for estimating an initial oil temperature at vehicle start-up according to the present disclosure.

Before a detailed discussion, a brief description of drawings is presented. FIG. 2 shows a functional block diagram of an engine in which the physics-based model may be used. FIG. 3 graphically depicts sources of heat and heat transfer areas in a representative cylinder. FIG. 4 graphically depicts exemplary temperature estimation points used in modeling heat energy of the engine. FIG. 5 shows an example of the physics-based model implemented in an engine control module. FIGS. 6, 7, and 8 depict exemplary modules used in estimating the oil temperature. FIG. 6 is an overview. FIG. 7 calculates parameters for the physics-based model. FIG. 8 uses the parameters to determine temperatures in various engine modes. FIG. 9 shows an exemplary method for estimating the oil temperature at vehicle start-up. FIGS. 10 through 18 depict an exemplary implementation of the physics-based model for an oil cooler, which can be integrated with the physics-based oil temperature model.

Referring now to FIG. 2, a functional block diagram of an engine system 100 is presented. The engine system 100 includes an engine 102 that combusts an air/fuel mixture to produce drive torque for a vehicle based on a driver input module 104. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, 12, and/or 16 cylinders. The ECM 114 may instruct a cylinder actuator module 120 to selectively deactivate some of the cylinders to improve fuel economy.

Air from the intake manifold 110 is drawn into the representative cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal received from the ECM 114, a spark actuator module 126 energizes a spark plug 128 in the cylinder 118, which ignites the air/fuel mixture. The timing of the spark may be specified relative to the time when the position of the piston is at a topmost position called a top dead center (TDC). The TDC is a point at which the air/fuel mixture is most compressed.

The combustion of the air/fuel mixture drives the piston down, thereby driving a rotating crankshaft (not shown). The piston then begins moving up and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In some implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by halting provision of fuel and spark. Alternatively or additionally, the cylinder actuator module 120 may deactivate cylinders by disabling exhaust and/or intake valves of the cylinders.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals received from the ECM 114.

The engine system 100 may include a boost device that provides pressurized air to the intake manifold 110. For example, FIG. 2 depicts a turbocharger 160. The turbocharger 160 is powered by exhaust gases flowing through the exhaust system 134 and provides a compressed air charge to the intake manifold 110. The air used to produce the compressed air charge may be taken from the intake manifold 110.

A wastegate 164 may allow the exhaust gases to bypass the turbocharger 160, thereby reducing the turbocharger's output (or boost). The ECM 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate some of the heat of the compressed air charge. The heat may be generated when air is compressed and may be increased by proximity to the exhaust system 134. Alternate engine systems may include a supercharger that provides compressed air to the intake manifold 110 and that is driven by the crankshaft.

The engine system 100 may include numerous valves and sensors. For example, the engine system 100 may include an exhaust gas recirculation (EGR) valve 170 that selectively redirects exhaust gas back to the intake manifold 110. The engine system 100 may measure the speed of the crankshaft in revolutions per minute (RPM) using an RPM sensor 180. The temperature of the coolant may be measured using a coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In some implementations, engine vacuum may be measured, where engine vacuum is the difference between ambient air pressure and the pressure within the intake manifold 110. The mass of air flowing into the intake manifold 110 may be measured using a mass air flow (MAF) sensor 186.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals received from the sensors to control the engine system 100.

The ECM 114 may communicate with a transmission control module 194 to coordinate shifting gears in a transmission (not shown). For example, the ECM 114 may reduce torque during a gear shift. The ECM 114 may communicate with a hybrid control module 196 to coordinate operation of the engine 102 and an electric motor 198. The electric motor 198 may also function as a generator and may be used to produce electrical energy for use by vehicle electrical systems. The electrical energy may be stored in a battery (not shown). In some implementations, the ECM 114, the transmission control module 194, and the hybrid control module 196 may be integrated into one or more modules.

Generally, each system that varies an engine parameter may be referred to as an actuator. For example, the throttle actuator module 116 can change the blade position, and therefore the opening area, of the throttle valve 112. The throttle actuator module 116 can therefore be called a throttle actuator, and the throttle opening area can be called a throttle actuator position.

Similarly, the spark actuator module 126 can be called a spark actuator, and the spark actuator positions may include amounts of spark advance and/or spark retard. Other actuators include the boost actuator module 162, the EGR valve 170, the phaser actuator module 158, the fuel injection system 124, and the cylinder actuator module 120. The term actuator position with respect to these actuators may correspond to boost pressure, EGR valve opening, intake and exhaust cam phaser angles, air/fuel ratio, and number of cylinders activated, respectively.

Referring now to FIG. 3, heat generation and heat transfer in a representative cylinder is shown. Heat is generated in many ways. For example, heat is generated from combusting an inner fuel mixture in the combustion chamber. A combustion temperature may be a function of air/fuel ratio, spark timing, manifold absolute pressure, and/or engine speed. The heat from combustion is transferred to surrounding inner components.

Heat is also generated from friction (called frictional heat). For example, the frictional heat is generated from friction between the piston and the piston liner. Other sources of the frictional heat include the oil pump, the main bearing, and camshafts.

Heat generation may be estimated based upon engine RPM and the number of valves. Heat generated by the piston may be related to the bore and the stroke of the engine. Heat is transferred between engine components and the oil. Heat is also transferred between engine components, including between the block and circulating coolant. Further, heat may be removed from the oil via an optional oil cooler. Heat may be radiated from the oil pan 52 at a rate related to vehicle velocity. Heat may circulate within the oil bath 50 in the oil pan 52 at a rate related to the viscosity of the oil.

Referring now to FIG. 4, exemplary nodes where temperatures may be calculated in the physics-based oil model is shown. Node 1 represents the temperature due to heat generated by combustion. The dashed lines going from node 1 to nodes 2 and 8 represent transfer of heat from combustion gas to the piston crown and the piston liner, respectively. The heat transfer may be described by a heat transfer coefficient for gas ($HTC_{GAS}$).

Node 3 represents the temperature at the piston rings. Node 4 represents the temperature at the piston skirt. Nodes 8, 9, and 15 represent the temperature at various points in the engine block. Node 15 is shown in a square instead of a circle to indicate that node 15 is associated with a thermal capacitance. Similarly, nodes U and L are associated with a thermal capacitance. Nodes U and L represent the upper and lower portions of the oil sump, respectively.

Nodes 10 and 11 represent temperatures at various points in cooling passageways of the engine. Heat transfer between node U and nodes 2, 4, 9, and 15 may be described by a heat transfer coefficient for oil ($HTC_{OIL}$). Also shown is heat transfer between node 11 and under hood, which includes air under the hood of the engine as well as air traveling along an underbody of the vehicle. Also shown is heat transferred between the optional oil cooler and the oil in the oil sump.

The heat transfer coefficient between the combustion gas and the engine components may be derived from the intake airflow rate. The nodes involved in the heat transfer are the piston crown (node 2) and the piston liner (node 8). An equation that may be used to evaluate the heat transfer coefficient is:

$$htc_{GAS} = C_1 \cdot Charge^3 + C_2 \cdot Charge^2 + C_3 \cdot Charge + C_4$$

Charge=(AirFlow+FuelFlow)/Number of $Cyl$ (in kg/sec)

The conductance values between node 1 and nodes 2 and 8 may be obtained by multiplying the heat transfer coefficient by the appropriate area for heat transfer. The areas may be calculated as follows, where $L_1$ is the distance from the top of the piston to the first piston ring:

$$A_1 = \frac{\pi}{4} \cdot Bore^2 + \pi \cdot Bore \cdot L_1$$

$$A_4 = \pi \cdot Bore \cdot \frac{Stroke}{2}$$

The heat transfer coefficient between splashing oil (node U) and the engine (nodes 2, 4, 9, and 15) may be estimated based on engine RPM as follows:

$$htc_{OIL} = 220(RPM/5000)^2 \cdot OilMF$$

where the quantity "OilMF" is a calibration variable that may initially be set to 1.0. The quantity "OilMF" may be increased if the model consistently predicts low oil temperatures.

The area for heat transfer between splashing oil and respective engine parts may be determined as follows:

$$A_{007} = \frac{\pi}{4}(Bore - 2 \cdot Piston\ Thickness)^2$$

$$A_{012} = \pi(Bore - 2 \cdot Piston\ Thickness)$$

(Piston Height− Piston Crown Thickness)

$$A_{013} = \pi \cdot Bore \cdot (T2 - T1)$$

$$A_{021} = (Block\ Height - Liner\ Length)$$

(2·Block Length+ 2·Block Width)/No. of Cylinders where,

T2=Liner Length−Stroke−TRPos−Head Clearance

T1=Piston Height−Piston Thickness−Stroke/2

TRPos=Distance from piston crown to the top of first ring

Heat transfer between the engine components (e.g., by conduction) may be modeled using conductance estimated from the geometry of the engine. The conductance value may be calculated based on thermal conductivity of the metal and the area for heat transfer. The area for heat transfer may be determined as follows:

$$Area_5 = 1.1 \cdot \pi \frac{[Piston\ Diameter^2 - (Bore - 2 \cdot Ring\ Width)^2]}{TRPos}$$

$$Area_8 = 1.1 \cdot \pi \frac{[Piston\ Diameter^2 - (Bore - 2 \cdot Ring\ Width)^2]}{[(Piston\ Height + Piston\ Crown\ Thickness - 2 \cdot TRPos - Ring\ Height)/2]}$$

$$Area_{10} = \frac{[\pi \cdot Bore \cdot (Piston\ Height - TRPos - Ring\ Height - EL59)]}{Piston\ To\ Liner\ Clearance}$$

$$Area_{11} = \frac{2 \cdot \pi \cdot Stroke}{\log\left[\frac{(Bore + Liner\ Thickness/2)}{Bore}\right]}$$

$$Area_{59} = \frac{(\pi \cdot Bore \cdot EL59)}{Piston\ To\ Liner\ Clearance}$$

$$EL59 = Height\ of\ Piston - TRPos - Stroke/2.0$$

where the term "TRPos" is the distance from the piston crown to the top of the first piston ring.

Four frictional heat generation terms may be used by the model to evaluate friction at the piston skirt, main bearing, oil pump, and camshafts. The frictional heat generated at these locations may be calculated as follows:

$Q_{MAINBEARING} = (0.0000217*RPM^2 - 0.00674*RPM)* VCF$ $Q_{CAM} = (0.109*RPM - 63)*VCF*(n_{iv} + n_{ev})/4$ $Q_{OILPUMP} = (0.0694*RPM - 57.5)*VCF$ $Q_{PISTONSKIRT} = (0.0000263*RPM^2 + 0.0366*RPM)* VCF*Bore*Stroke^{1.5}/0.00228$ $VCF = -0.000000917*T^3 + 0.000314*T^2 - 0.0416*T + 2.88$ where the term "VCF" is a viscosity correction factor that accounts for variation in frictional heat generation with oil viscosity. The estimates above are for a single cylinder and can be multiplied by the number of cylinders to get the total frictional heat.

Air flow underneath the oil pan 52 removes some of the heat from the oil. The amount of heat dissipated through the oil pan 52 may be based on the underbody air temperature and the underbody heat transfer coefficient. The air flowing over the oil pan 52 may be a mixture of underbody air that goes under the bumper and air that flows through the radiator. Air arriving from the radiator has been heated by heat released from coolant.

When the vehicle is warming up and the thermostat is closed, the radiator heat transfer is nearly 0, and so the radiator discharge air is close to an ambient temperature. When the thermostat opens and the radiator starts discharging engine heat, the air coming out of the radiator is considerably warmer. Therefore, until a thermostat-open temperature is reached, the underbody air temperature may be approximately equal to the ambient temperature.

Once the thermostat-open temperature is reached, the underbody air temperature is estimated using the following equation:

$$T_{UH} = C_1 \frac{\text{Engine RPM}}{\text{Vehicle Speed}} + C_2 + T_{Amb}$$

A value of 0.275 for constant $C_1$ and 0.0 for constant $C_2$ may be used as starting points, although $C_2$ is not necessarily 0.

The heat transfer conductance for the underbody may be modeled using the following equation:

$G_{UH} = C_3 \cdot A_{PAN} \cdot \text{Vehicle Speed} + C_4 \cdot A_{PAN}$

The constants $C_3$ and $C_4$ may scale with oil pan surface area. For example only, $C_3 * A_{PAN}$ may equal 0.098 and $C_4 * A_{PAN}$ may equal 14.91. Selection of $C_3$ and $C_4$ may strongly affect performance of the oil temperature model.

The nodes shown by circles in FIG. 4 are not associated with a thermal capacitance, and their temperature may be determined using a simple equation. Examples of the equations include:

$$T_2 = \frac{G_1 T_1 + G_5 T_3 + G_{007} T_O}{G_1 + G_5 + G_{007}}$$

$$T_3 = \frac{G_5 T_2 + G_9 T_5 + G_8 T_4}{G_5 + G_9 + G_8}$$

$$T_4 = \frac{G_8 T_3 + G_{10} T_5 + G_{012} T_{OU} + G_{59} T_9}{G_8 + G_{10} + G_{012} + G_{59}}$$

$$T_5 = \frac{G_9 T_3 + G_{11} T_8 + G_{10} T_4 + Q_{PISTON}}{G_9 + G_{11} + G_{10}}$$

$$T_8 = \frac{G_4 T_1 + G_{11} T_5 + G_{017} T_C}{G_4 + G_{11} + G_{017}}$$

$$T_9 = \frac{G_{59} T_4 + G_{013} T_{OU}}{G_{59} + G_{013}}$$

The conductance values may be obtained by multiplying the thermal conductivity by the appropriate area. For example, $G_5$, the conductance of node 5, may be obtained by multiplying the piston thermal conductivity by area $A_5$. The conductivity for heat transfer from gas and oil may be given by the following equation:

$G_1 = htc_{GAS} \cdot A_1$ $G_4 = htc_{GAS} \cdot A_4$ $G_{007} = 1.5 \cdot htc_{OIL} \cdot A_7$ $G_{012} = 1.5 \cdot htc_{OIL} \cdot A_{12}$ $G_{013} = 1.5 \cdot htc_{OIL} \cdot A_{13}$ $G_{021} = 4.0 \cdot htc_{OIL} \cdot A_{21}$ where $htc_{GAS}$ is the heat transfer coefficient of heat transfer from the combustion gas to the piston liner, and $htc_{OIL}$ is the heat transfer coefficient of heat transfer from the splashing oil.

The three nodes shown with squares, nodes U and L, and the engine block node 15 are associated with considerable thermal capacitance. The energy balance for these nodes may be represented by the following differential equations. The differential equations are for the upper section of the oil sump, the lower section of the oil sump, and the engine block, respectively.

$$\frac{dT_{OU}}{dt} = \frac{1}{(mC_P)_{OU}} \begin{bmatrix} G_{007}(T_2 - T_{OU}) + G_{012}(T_4 - T_{OU}) + \\ G_{013}(T_9 - T_{OU}) + G_{012}(T_{15} - T_{OU}) + \\ \dot{m}_C C_{PO}(T_{OL} - T_{OU}) + Q_{TOTAL} \end{bmatrix}$$

$Q_{TOTAL} = N_{CYL}(Q_{CAM} + Q_{MAIN\ BEARING} + Q_{OIL\ PUMP}) - Q_{COOLER}$ $$\frac{dT_{OU}}{dt} = \frac{1}{(mC_P)_{OL}} [\dot{m}_C C_{PO}(T_{OU} - T_{OL}) + G_{UH}(T_{UH} - T_{OL})]$$

$$\frac{dT_{15}}{dt} = \frac{1}{(mC_P)_{Block}} [G_{042}(T_C - T_{15}) + G_{021}(T_{OU} - T_{15})]$$

where the quantities $(mC_P)_{OU}$ and $(mC_P)_{OL}$ represent the thermal capacitance of the upper and lower sections of the oil pan and should each be equal to half the thermal capacitance of the oil in the engine. The quantity $(mC_P)_{Block}$ is the thermal capacitance of the block. The quantity $\dot{m}_C$ is an estimate of the level of mixing of oil between the lower and the upper sections of the pan and is a flow rate measured in kg/sec.

The equation used to calculate this flow rate is as follows.

$\dot{m}_C C_{PO} = MF_{OF}(0.00000191 \cdot T_{OU}^4 + 0.000311 \cdot T_{OU}^3 + 0.0202 \cdot T_{OU}^3 + 0.633 \cdot T_{OU} + 8.23)$ where the factor $MF_{OF}$ is an oil flow multiplication factor. The factor $MF_{OF}$ may be 1.0 when the ambient temperature is cold. The factor $MF_{OF}$ may be reduced until a satisfactory result is achieved. The factor $MF_{OF}$ may be reduced once the engine warms up, when the temperature difference between the upper and lower sections of the oil pump may be negligible. The selection of the factor $MF_{OF}$ may also strongly impact the performance of the physics-based model.

Constants $C_1$ and $C_2$ can be tuned based on test data for under the pan ambient temperature. The constant $MF_{OF}$ can be tuned based on the difference between the temperatures of the upper and lower sections of the oil sump. The constant $MF_{OF}$ may be reduced if the temperature difference is higher. The constant $MF_{OF}$ may be in the 0.01 to 1.0 range. Constants $C_3$ and $C_4$ may be tuned to match the measured oil temperature after selecting the factor $MF_{OF}$ and the constants $C_1$ and $C_2$.

In order to calibrate the vehicle, the vehicle may be cold started and accelerated to 65 mph at −7° C. ambient temperature. Data can be recorded during this acceleration. Data can be recorded for temperatures at steady-state speeds of 25 mph, 45 mph, and 85 mph, respectively. The tests can then be repeated at 43° C. When the engine is used in multiple applications, the test at −7° C. may only need to be performed for one application. Tests at 43° C. can be performed for each application. Multiple applications may be accommodated by varying the constants $C_1$ and $C_2$.

Referring now to FIG. 5, a functional block diagram of an exemplary implementation of the engine control module 114 is presented. The engine control module 114 includes an oil temperature module 202. The oil temperature module 202 includes an oil temperature determination module 204 and an estimation validity determination module 206. The oil temperature determination module 204 outputs an oil temperature based on numerous parameters. The parameters include the number of cylinders in the engine, an equivalence ratio (a ratio of air/fuel to stoichiometric), an induction temperature, a vehicle speed, an engine RPM, an engine air flow, a coolant temperature, number of cylinders fueled, the coolant temperature at power down, the oil temperature at power down, and the ambient temperature. Additionally, the oil temperature determination module 204 outputs an oil temperature based on whether at oil temperature or power down was valid and whether ambient temperature is valid.

The oil temperature is received by a remedial action module 220 and a torque control and estimation module 230. The estimation validity determination module 206 outputs a signal indicating whether the oil temperature is valid based on numerous factors. The factors include whether the ambient temperature is valid, vehicle speed reliability, mass air flow, sensor reliability, manifold absolute pressure (MAP), engine coolant temperature (ECT) sensor reliability, intake air temperature (IAT) sensor reliability, and IAT sensor circuit reliability.

Based on the oil temperature and whether the oil temperature is valid, the remedial action module 220 determines whether the oil temperature is within an acceptable range. If the oil temperature exceeds a threshold, the remedial action module 220 may decrease engine torque, may illuminate a warning indicator, may set error codes, and/or may perform any other suitable remedial action. The torque control and estimation module 230 may use the oil temperature to estimate the current amount of torque produced by the engine and to determine desired actuator positions to achieve the desired torque. Actuator positions, such as throttle area, may change as the oil temperature changes. In addition, torque reserve established in the engine, where the spark is retarded from a calibrated value to allow for quick increases in torque, may be dependent upon oil temperature.

Referring now to FIG. 6, a functional block diagram of an exemplary implementation of the oil temperature determination module 204 is presented. The oil temperature determination module 204 includes an input conversion module 250, a parameter calculation module 252, an oil cooler module 254, a thermal calculation module 256, and an output module 258.

The input conversion module 250 converts the units of incoming values into appropriate units for the physics-based oil temperature model. The input conversion module 250 may also buffer and/or filter various inputs. The input conversion module 250 outputs the number of engine cylinders, the equivalence ratio, the vehicle speed, the ambient temperature, the engine RPM and, the engine air flow to the parameter calculation module 252. The input conversion module 250 also outputs the coolant temperature, the number of cylinders fueled, the coolant temperature at power down, and whether the oil temperature at power down was valid to the thermal calculation module 256.

The parameter calculation module 252 determines heat transfer coefficients and frictional conductance values. The heat transfer coefficients include heat transfer coefficients between the combustion gas and the piston, between the combustion gas and the piston liner, between the oil and the block, between the oil and the piston crown, between the oil and the piston wall, between the oil and the piston liner, and between the oil pan and under hood air. The frictional conductance values include frictional conductance values for the main bearing, the piston skirt, the cam, and the oil pump to the thermal calculation module 256. The parameter calculation module 252 outputs the heat transfer coefficients and the frictional conductance values to the thermal calculation module 256. In addition, the parameter calculation module 252 outputs an under hood temperature, a gas temperature, and a pan oil flow value to the thermal calculation module 256.

The thermal calculation module 256 receives a number of cylinders from the input conversion module 250. When an oil cooler is present, the thermal calculation module 256 receives an oil cooler conductance value from the oil cooler module 254. The thermal calculation module 256 outputs an upper oil sump temperature and a lower oil sump temperature to the output module 258. The thermal calculation module 256 also outputs the upper sump temperature to the parameter calculation module 252. The output module 258 outputs a single oil temperature based upon the temperatures in the upper and lower sections of the oil sump. The output module 258 makes this combination based upon an output calibration.

In some implementations, the output calibration may instruct the output module 258 to select the upper sump temperature as the overall oil temperature to the output. This may provide a more conservative (higher) estimate of oil temperature to protect engine components such as camshafts. In some implementations, the output calibration may be set between 0 and 1, where the oil temperature output is a blend of the lower sump temperature and the upper sump temperature.

Referring now to FIG. 7, a functional block diagram of an exemplary implementation of the parameter calculation module 252 is presented. The parameter calculation module 252 includes a heat transfer and oil viscosity calculation module 302. The heat transfer and oil viscosity calculation module 302 determines the heat transfer coefficient for combustion gas and for oil. In addition, the heat transfer and oil viscosity calculation module 302 outputs an oil viscosity factor and a pan oil flow. The heat transfer and oil viscosity calculation module 302 determines these values based upon the number of cylinders, the equivalence ratio, the upper sump temperature, the engine air flow, and the engine RPM.

The oil viscosity factor is received by an oil splash/engine block heat transfer module 304 and a friction calculation module 306. An area calculation module 308 receives the number of cylinders and outputs respective conduction areas between the combustion gas and the piston, the gas and the piston liner, the oil and the block, the oil and the piston crown, the oil and the piston wall, and the oil and the liner. The oil splash/engine block heat transfer module 304 receives these areas and outputs heat transfer coefficients.

The friction calculation module 306 receives the engine RPM and the oil viscosity factor. The friction calculation module 306 outputs frictional conductance values for the main bearing, the piston skirt, the through cam, and the oil pump. An under hood determination module 310 receives the engine RPM, the vehicle speed, and the ambient temperature. The under hood determination module 310 generates an under hood temperature and a heat transfer coefficient between the oil pan and the under hood air. A combustion temperature module 312 generates a combustion gas temperature. In some implementations, a constant may provide adequate accuracy. The constant may be 1100° C.

Referring now to FIG. 8, a functional block diagram of an exemplary implementation of the thermal calculation module 256 is presented. The thermal calculation module 256 includes an initialization module 404. The initialization module 404 receives the coolant temperature, the coolant temperature at power down, whether oil temperature at power down was valid, and the ambient temperature.

As described in more detail with respect to FIG. 9, the initialization module 404 determines initial temperatures for the engine block, the upper oil sump, the lower oil sump, and the initial oil temperature. After the engine has been powered down, the temperature of the engine block approaches the temperature of the coolant. In addition, the temperature of the coolant and the temperature of the oil approach the ambient temperature.

The initialization values for the engine block, the upper oil sump, and the lower oil sump are received by selector modules 410, 412, and 414, respectively. The selector modules 410, 412, and 414 select the input that was most recently received. In other words, upon start-up, the selector modules 410, 412, and 414 select a value received from the initialization module 404. Once the selector modules 410, 412, and 414 receive calculated or estimated values, these newly-received values will be output. The selector modules 410, 412, and 414 can also receive 0 in initialization inputs, which resets the temperatures to a reset value, such as 0° C.

The nodes labeled with squares in FIG. 4 each have its own calculation module. Each module associated with a node having thermal capacitance may include an integrator that solves the differential equation for that node.

The temperature of the engine block is determined by an engine block module 420. The temperature of the lower oil sump is determined by a lower sump module 422. The temperature of the upper oil sump is determined by an upper sump module 424.

The nodes indicated by circles in FIG. 4 are determined by a simple node module 430. The simple nodes module 430 may be divided into two sets, one for activated cylinders and one for deactivated cylinders. This division may be done in an engine offering active fuel management (AFM). In AFM, some or all of the cylinders are deactivated in order to increase fuel economy when the torque from all cylinders is not required. Deactivated cylinders do not receive fuel and therefore do not have combustion gas to generate heat. For the cylinders deactivated by AFM, the combustion gas temperature may be set to the coolant temperature.

The simple nodes module 430 receives heat transfer coefficients for the oil and piston crown, oil and piston wall, oil and liner, gas and piston, and gas and liner. The simple nodes module 430 also receives the coolant temperature, the combustion gas temperature, and the conduction value for the piston skirt. In addition, the simple nodes module 430 receives the upper oil sump temperature from the selector module 412 and the initial oil temperature from the initialization module 404. The simple nodes module 430 then outputs six node temperature values to the upper sump module 424.

The lower sump module 422 receives the pan oil flow value, the under hood temperature, the heat transfer coefficient for the under hood air, the upper oil sump temperature, and the initial oil temperature. Based on these values and a previous value of the lower oil sump temperature, the lower sump module 422 outputs a lower oil sump temperature to the selector module 414.

The upper sump module 424 outputs an upper oil sump temperature to the selector module 412 based on numerous inputs received. The inputs include the previous value of the lower sump temperature, the engine block temperature, the previous value of the upper sump temperature, the initial oil temperature, the number of cylinders fueled, the number of cylinders, the simple node temperatures from the simple nodes module 430, the pan oil flow value, and values received from the parameter calculation module 252.

The values received from the parameter calculation module 252 include the conduction values for the oil cooler, the main bearing, the cam, the oil pump, and the heat transfer coefficients for the oil to piston crown, oil to piston wall, oil to liner, and oil to block. A register 440 stores the value of the upper sump temperature and outputs the upper sump temperature from the thermal calculation module 256.

Referring now to FIG. 9, a flow chart depicts exemplary steps performed in determining initial oil temperature is presented. These steps may be performed by the initialization module 404 of FIG. 8. Before describing the flowchart, a mathematical model used to estimate the initial temperature is discussed.

As the engine cools down, convection from the engine block reduces the temperature of the coolant. Convection from the oil pan reduces the temperature of the oil. Convection from the oil pan and the engine block may be determined as follows:

$$\text{Convection From Oil Pan} = htc \cdot A_{Pan\ Surface} \cdot (T_{Pan} - T_{Amb})$$

$$\text{Convection From Block} = htc \cdot A_{Bloc\ Surface} \cdot (T_{Block} - T_{Amb})$$

The convection areas of the engine block surface and the pan surface may be determined as follows, although actual measured values may be used:

$$A_{Block\ Surface} = 2 \cdot \text{Block Height} \cdot (\text{Block Length} + \text{Block Width})$$

$$A_{Pan\ Surface} \approx 1.5 \cdot (\text{Block Length} \cdot \text{Block Width})$$

When calculating time constants of temperature change, the mass and specific heat of the engine may be used. A product of mass and specific heat may be defined as $MC_P$. For example, the mass times specific heat of the engine block may be determined as follows:

$$MC_{P\ Block} = MC_{P\ Block\ Metal} + MC_{P\ Block\ Coolant}$$

$$MC_{P\ Block\ Coolant} \approx 1.4 \cdot \text{Engine Displacement} \cdot 3660$$

The temperature change of both the engine block and the oil may be modeled as exponential decays to the ambient temperature. Exemplary temperature equations and time constants are shown below:

$$T_{Block} = T_{Block\_KeyOff} -$$
$$(T_{Block\_KeyOff} - T_{Amb}) \cdot (1 - \exp(-\text{Time Since Key Off}/\tau_{Block}))$$
$$\tau_{Block} = \frac{MC_{PBlock}}{htc \cdot A_{Block}}$$
$$T_{Oil} =$$
$$T_{Oil\_KeyOff} - (T_{Oil\_KeyOff} - T_{Amb}) \cdot (1 - \exp(-\text{Time Since Key Off}/\tau_{Oil}))$$
$$\tau_{Oil} = \frac{MC_{POil}}{htc \cdot A_{Oil\_Pan}}$$

where htc is under hood heat transfer coefficient.

The coolant temperature can be measured using a coolant sensor. It can be assumed fairly accurately that the temperature of the engine block will be approximately equal to the temperature of the coolant. The temperature of the engine block may have been saved at the last key off where the engine was turned off.

Knowing the ambient air temperature, the above equation for $T_{Block}$ can be solved for $\tau_{Block}$, the only unknown. The heat transfer coefficient, htc, can therefore be determined from $\tau_{Block}$, $MC_{P\,Block}$, and $A_{Block}$. The value obtained for htc can then be used to determine $\tau_{Oil}$. The expression for $T_{Oil}$ can then be evaluated, giving an approximation for the current oil temperature.

The value for htc determined above may be limited to prevent erroneous calculations. For example, a maximum and minimum htc may be identified as follows:

Maxhtc≈20 W/m²-K

Min$htc$=6 W/m²-$K$

Referring back to FIG. 9, control begins in step 502, where the ambient temperature is measured. Control continues in step 504, where the coolant temperature is measured. It may be assumed that coolant temperature and the engine block temperature are approximately equal. Control continues in step 506, where control determines the difference between the measured coolant temperature and the coolant temperature that was measured the last time the key was turned off. Control continues in step 508, where the heat transfer coefficient htc is solved for. Control continues in step 510, where upper and lower limits may be applied to the heat transfer coefficient. Control continues in step 512, where the current oil temperature is determined based upon the calculated heat transfer coefficient, the ambient temperature, and the previous oil temperature.

Figure 10:
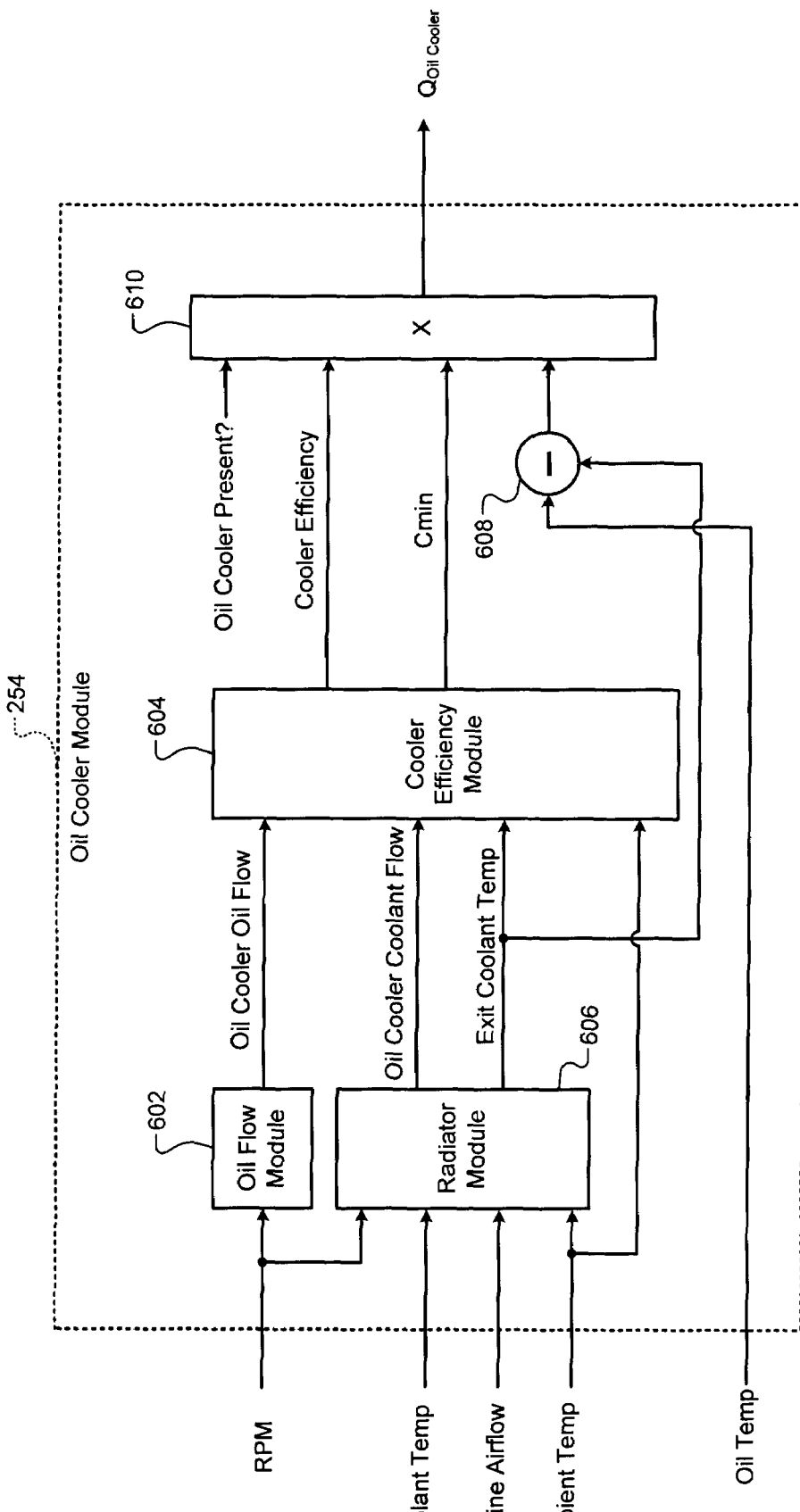
FIG. 10 is a functional block diagram of an oil cooler module used in the oil temperature determination module of FIG. 6.

Referring now to FIG. 10, a functional block diagram of an exemplary implementation of the oil cooler module 254 is presented. The oil cooler module 254 includes an oil flow module 602 that receives the engine RPM and that outputs an oil flow signal to a cooler efficiency module 604. The oil cooler module 254 also includes a radiator module 606 that receives the engine RPM, the coolant temperature, the engine air flow, and the ambient temperature. The radiator module 606 outputs a coolant flow signal and an exit coolant temperature to the cooler efficiency module 604. A subtraction module 608 subtracts the exit coolant temperature from the oil temperature. A multiplication module 610 multiplies a signal indicating whether the oil cooler is present by cooler efficiency and $C_{min}$ values from the cooler efficiency module 604. The multiplication module 610 also multiplies an output of the subtraction module 608. The output of the multiplication module 610 is the conduction value for the oil cooler.

Figure 11:
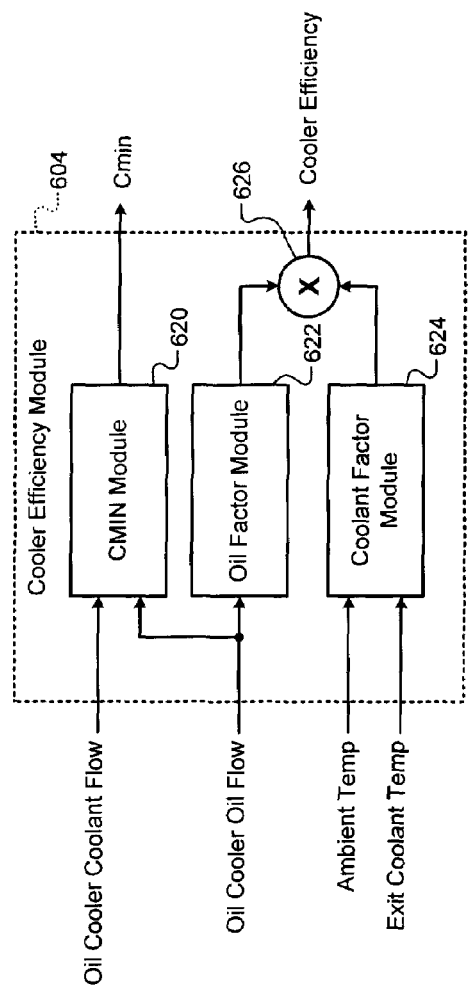
FIG. 11 a functional block diagram of an exemplary cooler efficiency module used in the oil cooler module of FIG. 10.

Referring now to FIG. 11, a functional block diagram of an exemplary implementation of the cooler efficiency module 604 is presented. The cooler efficiency module 604 includes a $C_{min}$ module 620, an oil factor module 622, and a coolant factor module 624. The $C_{min}$ module 620 outputs a $C_{min}$ value based on the coolant flow signal and the oil flow signal. The oil factor module 622 generates an output based on the oil flow value. The coolant factor module 624 generates an output based on the ambient temperature and the radiator exit coolant temperature. A multiplication module 626 multiplies outputs of the oil factor module 622 and the coolant factor module 624.

Figure 12:
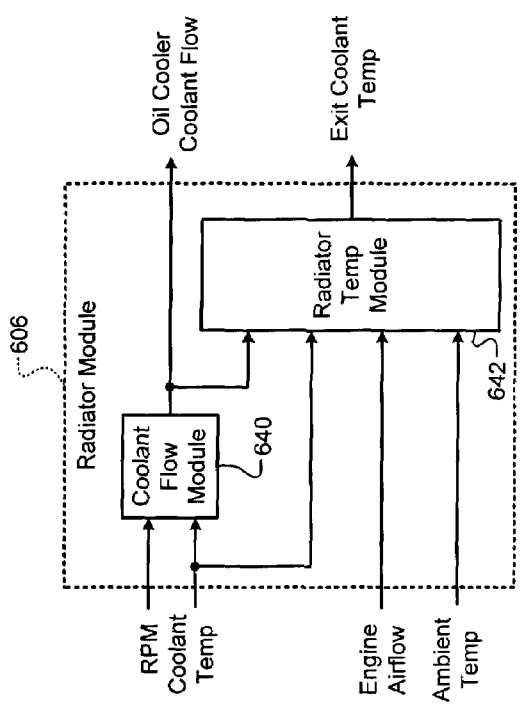
FIG. 12, a functional block diagram of an exemplary radiator module used in the oil cooler module of FIG. 10.

Referring now to FIG. 12, a functional block diagram of an exemplary implementation of the radiator module 606 is presented. The radiator module 606 includes a coolant flow module 640 and a radiator temperature module 642. The coolant flow module 640 produces a coolant flow value based upon the engine RPM and the coolant temperature. For example, the coolant flow module 640 may produce the coolant flow value as follows.

$$CoolFlow = \text{MIN}\left(\text{MAX}\left(0.000001, \frac{(TCool-81)}{(96-81)} \cdot (0.000206 \cdot RPM - 0.174)\right), 1\right)$$

The radiator temperature module 642 outputs an exit coolant temperature based on the coolant flow value, the coolant temperature, the engine air flow, and the ambient temperature.

Figure 13:
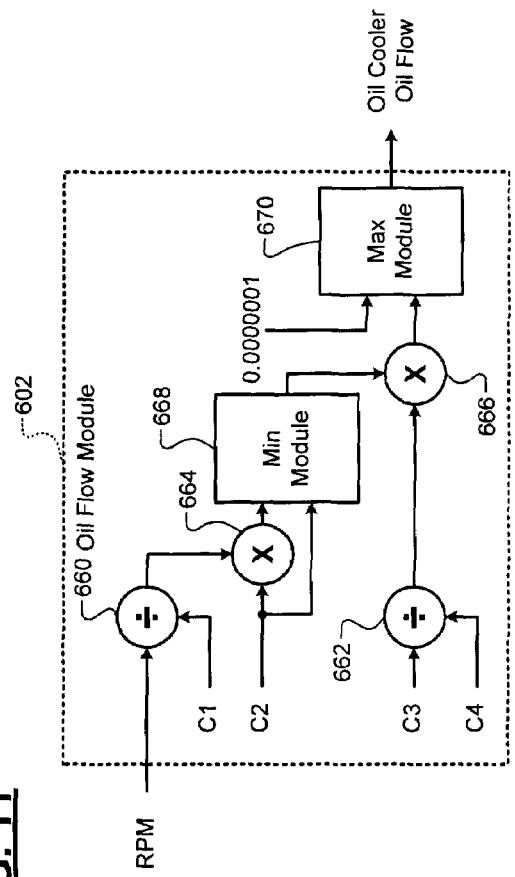
FIG. 13, a functional block diagram of an exemplary oil flow module used in the oil cooler module of FIG. 10.

Referring now to FIG. 13, a functional block diagram of an exemplary implementation of the oil flow module 602 is presented. The oil flow module 602 includes first and second division modules 660 and 662, and first and second multiplication modules 664 and 666. The oil flow module 602 also includes minimum and maximum modules 668 and 670. The oil flow module 602 generates the oil flow as follows.

$$OilFlow = \text{MAX}\left(\frac{\text{MIN}\left(\frac{RPM}{3400} \cdot 30, 30\right)}{60000} \cdot 800, 0.0000001\right)$$

The first division module 660 divides the engine RPM by $C_1$. The second division module 662 divides $C_3$ by $C_4$. The first multiplication module 664 multiplies the output of the first division module 660 by $C_2$. The minimum module 668 outputs the minimum of $C_2$ and the output of the multiplication module 664. The second multiplication module 666 multiplies the output of the minimum module 668 and the output of the division module 662. The maximum module 670 outputs the maximum of the output of the multiplication module 666 and a constant, such as 0.0000001.

Figure 14:
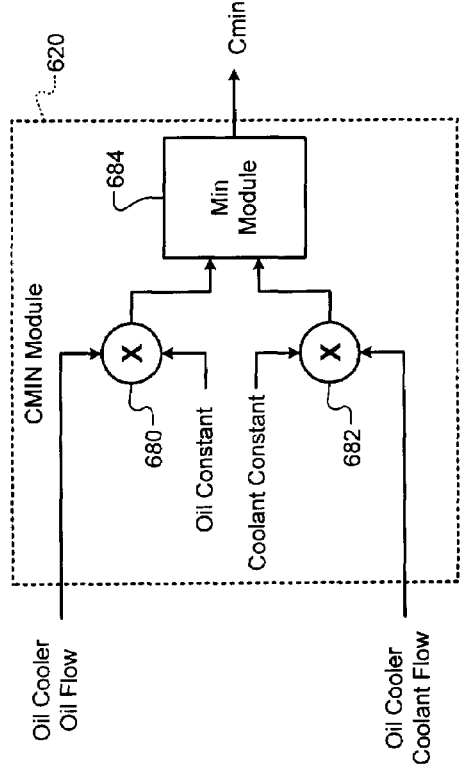
FIG. 14, a functional block diagram of an exemplary $C_{min}$ module used in the cooler efficiency module of FIG. 11.

Referring now to FIG. 14, a functional block diagram of an exemplary implementation of the $C_{min}$ module 620 is presented. The $C_{min}$ module 620 includes first and second multiplication modules 680 and 682. The minimum of the outputs of the multiplication modules 680 and 682 is output by a minimum module 684. The first minimum module 680 multiplies the oil flow value by an oil constant. The second multiplication module 682 multiplies the coolant flow by a coolant constant.

Figure 15:
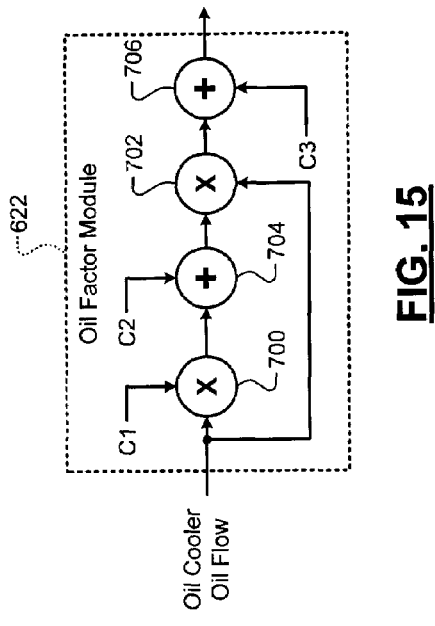
FIG. 15, a functional block diagram of an exemplary oil factor module used in the cooler efficiency module of FIG. 11.

Referring now to FIG. 15, a functional block diagram of an exemplary implementation of the oil factor module 622 is presented. The oil factor module 622 includes first and second multiplication modules 700 and 702, and first and second addition modules 704 and 706. The first multiplication module 700 outputs the product of the oil flow value and $C_1$. The first addition module 704 outputs the sum of $C_2$ and the output of the first multiplication module 700. The second multiplication module 702 outputs the product of the oil flow value and the output of the first addition module 704. The second addition module 706 outputs the sum of $C_3$ and the output of the second multiplication module 702.

Figure 16:
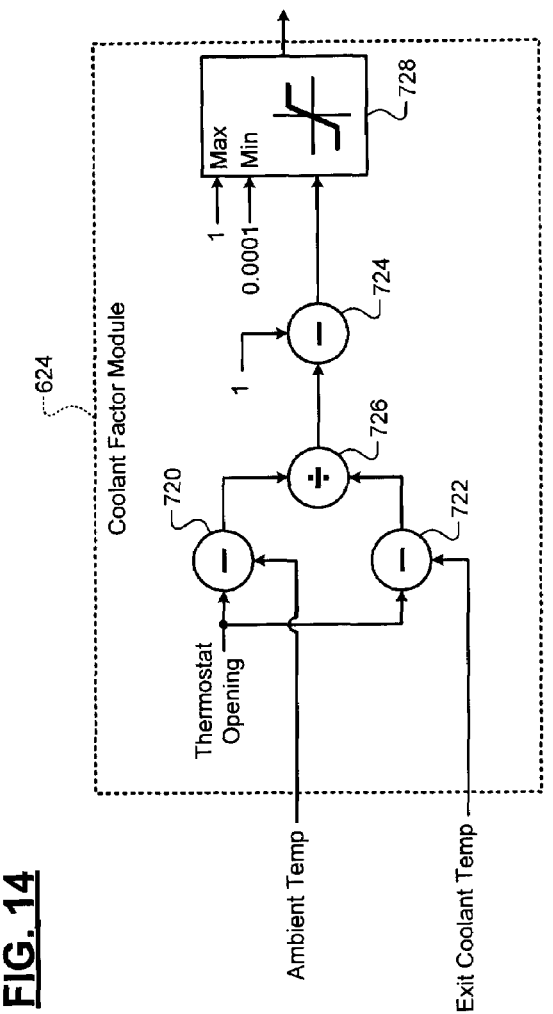
FIG. 16, a functional block diagram of an exemplary coolant factor module used in the cooler efficiency module of FIG. 11.

Referring now to FIG. 16, a functional block diagram of an exemplary implementation of the coolant factor module 624 is presented. The coolant factor module 624 includes first, second, and third subtraction modules 720, 722, and 724. The first and second subtraction modules 720 and 722 subtract the ambient temperature and the exit coolant temperature, respectively, from the temperature at which the thermostat opens. A division module 726 divides the outputs of the first and second subtraction modules 720 and 722. A third subtraction module subtracts the output of the division module 726 from 1. A min/max module 728 applies a minimum limit of 0.0001 and a maximum limit of 1 to the output of the third subtraction module 724.

Referring now to FIG. 17, a functional block diagram of an exemplary implementation of the coolant flow module 640 is presented. The coolant flow module 640 includes first and second multiplication modules 740 and 742. The first multiplication module 740 multiplies the engine RPM by C1. A first subtraction module 744 subtracts C2 from the output of the first multiplication module 740. Second and third subtraction modules 750 and 752 subtract the temperature at which the thermostat closes fully from the coolant temperature and the temperature at which the thermostat fully opens, respectively. A division module 748 divides the output of the second subtraction module 750 by the output of the third subtraction module 752. The min/max module 746 applies the minimum limit of 0.000001 and a maximum limit of 1 to an output of a division module 748. The second multiplication module 742 outputs the product of the outputs of the first subtraction module 744 and the min/max module 746.

Referring now to FIG. 18, a functional block diagram of an exemplary implementation of the radiator temperature module 642 is presented. The radiator temperature module 642 includes first and second multiplication modules 760 and 762. The first multiplication module 760 outputs the product of the engine air flow and $C_1$. The second multiplication module 762 outputs the product of the coolant flow value and $C_2$. An addition module 764 outputs the sum of the output of the first multiplication module 760 and $C_3$. A division module 766 divides the output of the addition module 764 by the output of the second multiplication module 762. A subtraction module 768 subtracts the output of the division module 766 from the coolant temperature. A maximum module 770 outputs the maximum of the ambient temperature and the output of the subtraction module 768.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
an input that receives a first oil temperature of an engine oil when an engine is turned on; and
a thermal data processing module that estimates a first heat transfer from a piston of said engine to said engine oil, that estimates a second heat transfer from said engine oil to an engine block of said engine, and that determines a second oil temperature of said engine oil based on said first oil temperature and said first and second heat transfers,
wherein said thermal data processing module estimates:
a heat transfer rate from combustion gases to said piston based on heat transfer coefficients of said combustion gases and said piston; and
said first and second heat transfers based on said heat transfer rate.

2. The system of claim 1 wherein said thermal data processing module estimates said first and second heat transfers using conductance values generated based on thermal conductivities and heat transfer areas of said engine.

3. The system of claim 1 wherein said thermal data processing module estimates said first and second heat transfers based on geometry of said engine.

4. The system of claim 1 wherein said thermal data processing module estimates:
heat generated due to friction between a ring and a liner of said piston based on an engine speed and a bore and a stroke of said engine;
heat transferred to said engine oil based on heat transfer coefficients of said engine oil, said piston, and said liner; and
said first and second heat transfers based on said heat transferred.

5. The system of claim 1 wherein said thermal data processing module estimates:
heat generated due to friction at an oil pump that pumps said engine oil and at a main bearing and cams of a crankshaft of said engine based on an engine speed and a number of valves of said engine; and
said first and second heat transfers based on said heat generated.

6. The system of claim 1 wherein said thermal data processing module estimates said first and second heat transfers based on an engine speed, an intake airflow rate, a vehicle speed, a coolant temperature of a coolant of said engine, and an air-to-fuel ratio.

7. The system of claim 1 wherein said thermal data processing module estimates:
heat transferred from said engine oil to said engine block based on at least one a viscosity of said engine oil and heat transfer coefficients of said engine oil and said engine block; and
said first and second heat transfers based on said heat transferred.

8. The system of claim 1 wherein said thermal data processing module estimates:
heat transferred from said engine oil to air around an oil pan of said engine based on at least one of a viscosity of said engine oil and heat transfer coefficients of said engine oil and said air; and
said first and second heat transfers based on said heat transferred.

9. A system comprising:
an input that receives a first oil temperature of an engine oil when an engine is turned on; and
a thermal data processing module that estimates a first heat transfer from a piston of said engine to said engine oil, that estimates a second heat transfer from said engine oil to an engine block of said engine, and that determines a second oil temperature of said engine oil based on said first oil temperature and said first and second heat transfers, wherein said thermal data processing module estimates:
- a rate of circulation of said engine oil in an oil pan of said engine based on at least one of a viscosity of said engine oil and a difference between temperatures of said engine oil in upper and lower sections of said oil pan; and
- said first and second heat transfers based on said rate.

10. A method comprising:
- receiving a first oil temperature of an engine oil when an engine is turned on;
- estimating a first heat transfer from a piston of said engine to said engine oil;
- estimating a second heat transfer from said engine oil to an engine block of said engine;
- determining a rate of circulation of said engine oil in an oil pan of said engine based on at least one of a viscosity of said engine oil and a difference between temperatures of said engine oil in upper and lower sections of said oil pan;
- estimating said first and second heat transfers based on said rate; and
- determining a second oil temperature of said engine oil based on said first oil temperature and said first and second heat transfers.

11. A method comprising:
- receiving a first oil temperature of an engine oil when an engine is turned on;
- estimating a first heat transfer from a piston of said engine to said engine oil;
- estimating a second heat transfer from said engine oil to an engine block of said engine;
- estimating a heat transfer rate from combustion gases to said piston based on heat transfer coefficients of said combustion gases and said piston;
- estimating said first and second heat transfers by estimating said heat transfer rate; and
- determining a second oil temperature of said engine oil based on said first oil temperature and said first and second heat transfers.

12. The method of claim 11 further comprising:
- generating conductance values based on thermal conductivity and heat transfer area of said engine; and
- estimating said first and second heat transfers using said conductance values.

13. The method of claim 11 further comprising estimating said first and second heat transfers based on geometry of said engine.

14. The method of claim 11 further comprising:
- estimating heat generated due to friction between a ring and a liner of said piston based on an engine speed and a bore and a stroke of said engine;
- estimating heat transferred from said friction to said engine oil based on heat transfer coefficients of said engine oil, said piston, and said liner; and
- estimating said first and second heat transfers by estimating at least one of said heat generated and said heat transferred.

15. The method of claim 11 further comprising:
- estimating heat generated due to friction at an oil pump that pumps said engine oil and at a main bearing and cams of a crankshaft of said engine based on an engine speed and a bore and a stroke of said engine; and
- estimating said first and second heat transfers by estimating said heat generated.

16. The method of claim 11 further comprising estimating said first and second heat transfers based on an engine speed, an intake airflow rate, a vehicle speed, a coolant temperature of a coolant of said engine, and an air-to-fuel ratio.

17. The method of claim 11 further comprising:
- estimating heat transferred from said engine oil to said engine block based on at least one a viscosity of said engine oil and heat transfer coefficients of said engine oil and said engine block; and
- estimating said first and second heat transfers based on said heat transferred.

18. The method of claim 11 further comprising:
- estimating heat transferred from said engine oil to air around an oil pan of said engine based on at least one of a viscosity of said engine oil and heat transfer coefficients of said engine oil and said air; and
- estimating said first and second heat transfers based on said heat transferred.

* * * * *